Feb. 8, 1955  J. E. WHITFIELD  2,701,683
INTERENGAGING ROTOR BLOWER
Filed Dec. 15, 1951  2 Sheets-Sheet 1

INVENTOR.
Joseph E. Whitfield
BY
Otto Moeller
Attorney

Feb. 8, 1955   J. E. WHITFIELD   2,701,683
INTERENGAGING ROTOR BLOWER
Filed Dec. 15, 1951   2 Sheets-Sheet 2

INVENTOR.
Joseph E. Whitfield
BY
Otto Moeller
Attorney

United States Patent Office 2,701,683
Patented Feb. 8, 1955

2,701,683

INTERENGAGING ROTOR BLOWER

Joseph E. Whitfield, Erie, Pa., assignor to Read Standard Corporation, New York, N. Y., a corporation of Delaware Application December 15, 1951, Serial No. 261,883

5 Claims. (Cl. 230—143)

This invention relates to rotary blowers, pumps, or superchargers of the cross flow type and more particularly to improvements in the rotors therefor.

An object of the invention is to provide a positive displacement blower wherein the profile of the rotors is such as to maintain a seal therebetween throughout their rotation to prevent leakage of fluid from the discharge side to the intake side.

Another object is to provide matching rotors for apparatus of the type described, that can be accurately cut in a simple and efficient manner.

More specifically it is an object to provide a pair of matching rotors in which the convex profile of the rotor lobes are generated by the intersection on the flanks of the convex and concave portions of the mating rotor; and the concave profile of the rotor lobes are generated by a point or points on the circumferential crest of the mating rotor.

Further objects and advantages of the invention will appear from the following description and from the drawings, which are intended for the purpose of illustration only, and in which.

Figure 2:
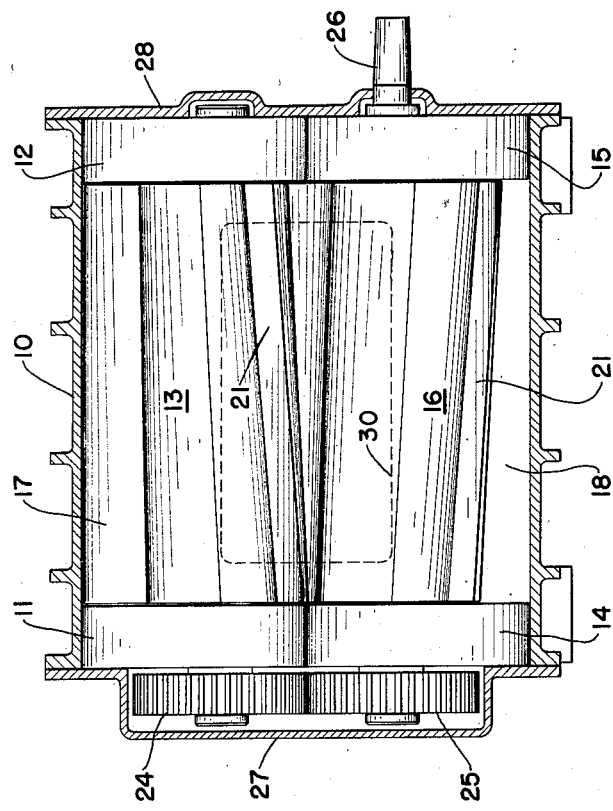
Figure 2 is a sectional view taken on the line 2—2 of Figure 1 with the rotors and other parts shown in elevation.
Figure 1:
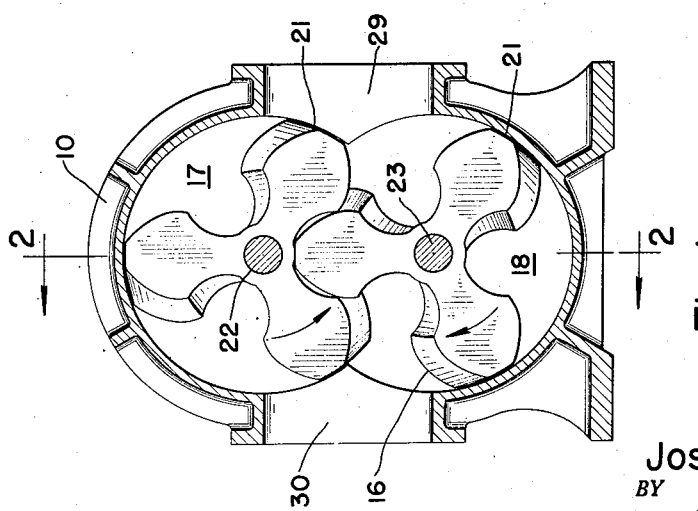
Figure 1 is a view in cross section through a blower housing, with the novel rotors, each provided with three lobes, disposed therein and shown in elevation.

Referring now to the accompanying drawings, in particular Figures 1 and 2, the numeral 10 designates the blower housing which is open at its opposite ends and in which ends are mounted bearing carriers 11 and 12 for the rotor 13 and bearing carriers 14 and 15 for the rotor 16. The housing 10 defines a pair of parallel cylindrical chambers 17 and 18 which intersect to form a large common chamber, the cross section of which is generally in the form of a figure 8, and in which chambers 17 and 18 are disposed the interengaging rotors 13 and 16, respectively.

As shown in Figures 1 and 2, the rotors 13 and 16 are each provided with three lobes. It is understood, however, that the number of lobes of the respective rotors may be varied, as shown for example in Figures 3 to 7, wherein rotor 19 is provided with three lobes and rotor 20 is provided with four lobes. The lobes of the rotor are formed with peripheral surfaces or crests indicated in Figures 1 and 2 by the numeral 21, that are formed on arcs described from the axes of the rotors as a center.

The rotors 13 and 16 are provided with respective shafts 22 and 23, journaled in suitable bearings disposed in the bearing carriers 11, 12, 14 and 15. Timing gears 24 and 25 are mounted on extensions of the rotor shafts 22 and 23, respectively, for synchronizing the operation of the rotors. The drive (not shown) for the rotors is connected to an extended shaft portion of one of the rotor shafts, in the present instance extended shaft portion 26 of the rotor shaft 23, at the end opposite the timing gears. End covers 27 and 28 form closures for the opposite open ends of the housing 10.

The housing 10 is provided at opposite sides of a plane intersecting the axes of the rotors 13 and 16 with the ports 29 and 30. With the rotors rotating in the direction of the arrows in Figure 1, 29 becomes the intake port and 30 the discharge port.

Whether the interengaging rotors have three lobes each, as shown in Figures 1 and 2, or one has three lobes and the other four, as shown in Figures 3 to 7, or some other lobe combination, the profiles or flanks of the rotor lobes are, in accordance with my invention, generated throughout and the manner of generating the profiles is the same. For convenience, the generation of the lobe profile will be described in connection with the rotors shown in Figures 3 to 7, it being understood that it applies similarly where rotors having a different number of lobes are employed.

Figure 3:
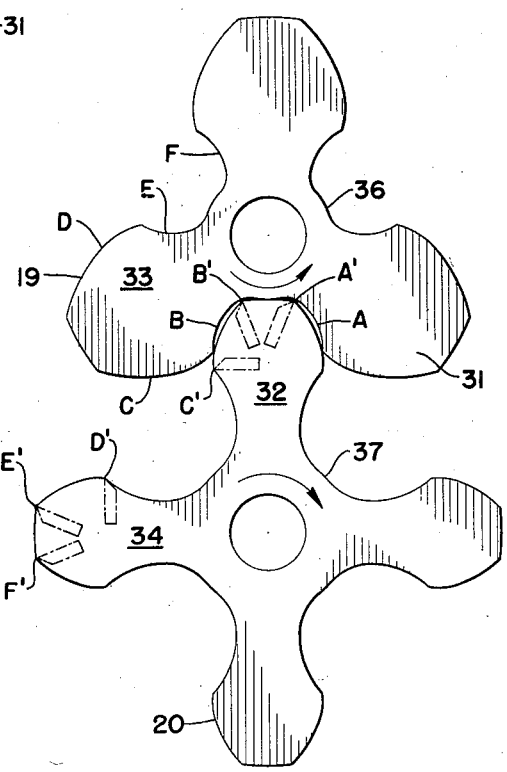

The contour of the trailing concave flank portion A of lobe 31 is generated by the path followed by the leading crest edge A' of the lobe 32 of mating rotor 20 as the rotors rotate in timed relation, while the contour of the leading concave flank portion B of lobe 33 is generated by the path followed by the trailing crest edge B' of the lobe 32 of mating rotor 20 as the rotors rotate in timed relation. In Figure 3 the crest edge A' is shown near the beginning of its path along the concave flank portion A and the crest edge B' is shown near the end of its path along the concave flank portion B.

Figure 4:
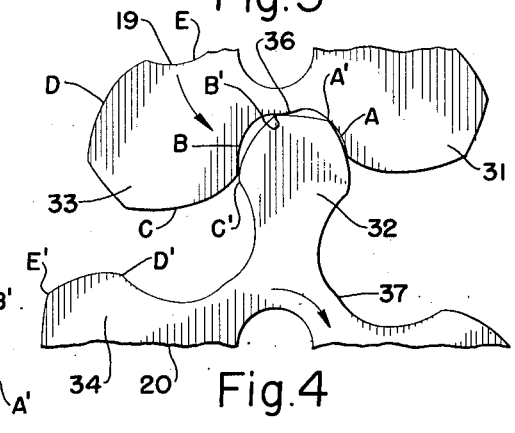

In Figure 4 the rotors 19 and 20 are shown in a slightly further stage of rotation from Figure 3, and it will be seen that the path of crest edge A' has progressed along the concave flank portion A and crest edge B' is just running out of its path along the concave flank portion B.

Figure 5:
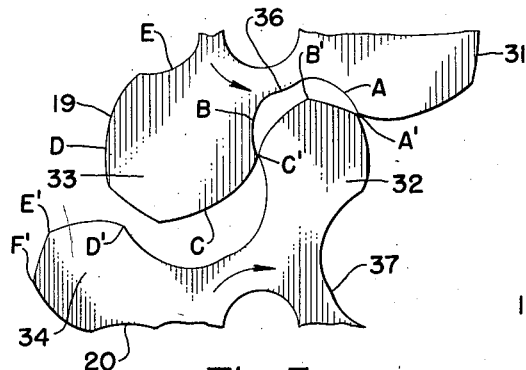
Figures 3, 4, 5, 6 and 7 are end or fragmentary end views of a modification wherein the pair of interengaging rotors are provided, respectively, with three and four lobes shown in progressively different positions of engagement.

The contour of the leading convex flank portion C of lobe 33 is generated by the path followed by the intersection C' of the trailing convex and concave portions of lobe 32 of mating rotor 20 as the rotors rotate in timed relation. In Figure 5 the rotors 19 and 20 are shown in a further stage of rotation than in Figure 4, and it will be seen that C' is just at the beginning of its path along C, while A' has completed its path along A, and B' has left its path along B.

Figure 6:
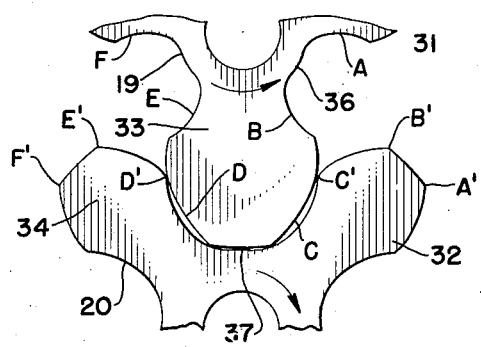

The contour of the trailing convex flank portion D of lobe 33 is generated by the path followed by the intersection D' of the leading convex and concave portions of lobe 34 of mating rotor 20 as the rotors rotate in timed relation. In Figure 6 the rotors 19 and 20 are shown in a further stage of rotation than in Figure 5, and it will be seen that D' is following its path along D, and C' is following its path along C.

Figure 7:
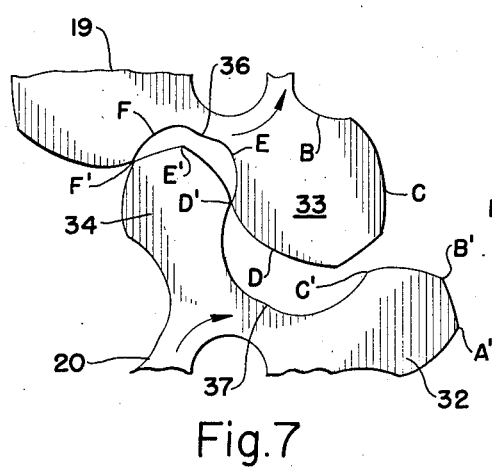

The contour of the remaining flanks of the lobes of rotor 19 are generated in similar manner. In Figure 7 showing a further stage of rotation of the rotors 19 and 20, it will be seen that C' has left its path along C, D' is just at the end of its path along D and another sequence of operation is about to begin. In other words, E' of lobe 34 of rotor 20 is approaching its path along E of lobe 33 of rotor 19 and F' of lobe 34 is just beginning its path along F of lobe 35.

In like manner the profile of the lobes of rotor 20 are generated by the crest edges and the intersection of the concave and convex portions of the mating rotor 19.

An important advantage of the novel rotors constituting my invention resides in the facility and accuracy by which the lobe profiles may be machined. This can be accomplished by mounting the rotor blank to be cut and the cutting tool on parallel rotating shafts, with the axes of the shafts spaced apart the same distance as the axes of the desired cooperating rotors. The cutters on the cutting tool are so disposed to simulate the intersection of the concave and convex portions of a mating rotor to generate on the blank the convex profile; and to simulate the crest of a mating rotor to generate on the blank the concave profile. In other words, referring to Figure 3, tool bits as shown in dot and dash lines would be so disposed to simulate the points A', B', C', D', E', F', etc. At the same time one of the shafts on which the blank and the cutting tool are mounted is moved in a relative axial direction so that the cutting tools cut the entire length of the blank. Rotation of the rotor blank shaft and cutting tool shaft are maintained in timed relation by a meshing gear and pinion which are in the same ratio as the ratio of the lobes of the desired rotors. Thus, if the lobes of the rotors bear a one to one ratio, as in Figures 1 and 2, the gear and pinion would bear a one to one ratio, or if the rotors bear a three to four ratio, as in Figures 3 to 7, the gear and pinion would bear a three to four ratio.

In the drawings the lobes of the rotors are shown formed on a helix since it provides for quieter operation. However, it is apparent that the lobes may be straight if so desired. In machining the rotors, if it is desired that they be provided with straight lobes, then the gear and pinion that time the blank and tool are provided with straight teeth, while if it is desired to have the rotor lobes formed on a helix as shown, then the gear and pinion are provided with teeth formed on a helix.

The rotors are provided with hub portions between adjacent lobes, which will be described in connection with the form of the invention shown in Figures 3 to 8. The hub portions of rotor 19 are indicated by the numeral 36 and the hub portions of rotor 20 by the numeral 37. The hub portions 36 and 37 are formed on a radius described from the axes of the rotors 19 and 20, respectively.

Figure 8:
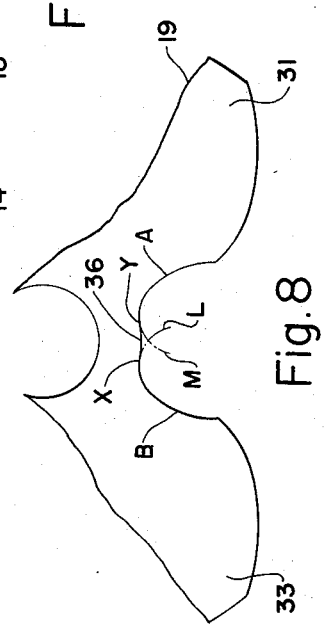
Figure 8 is a fragmentary, enlarged end view of one rotor, showing the contour of the root of the rotor lobes.

Referring to Figure 8 which is a fragmentary enlarged view showing the profile of two adjacent rotor lobes, for example, lobes 31 and 33 of rotor 19, and the hub portion 36 therebetween, B as previously described, is the contour of the leading portion of lobe 33 of rotor 19 generated by crest edge B' of lobe 32 of mating rotor 20, and L, shown in dot and dash, is a continuation of the path followed by B' as the rotors 19 and 20 rotate in timed relation. Similarly, A is the contour of the trailing portion of lobe 31 of rotor 19 generated by crest edge A' of lobe 32 of mating rotor 20, and M, shown in dot and dash, is a continuation of the path followed by A' as the rotors 19 and 20 rotate in timed relation.

The hub portion 36 is formed on an arc with the axis of rotor 19 as its center of curvature and tangent to the generated curves BL and AM. The points of tangency are represented in Figure 8 by the letters X and Y. The other hub portions 36 of rotor 19, and hub portions 37 of rotor 20 are formed in similar manner.

I claim:

1. A pair of interengaging rotors for use in a fluid device of the character described, the lobes of each of said rotors having convex addendum and concave dedendum portions intersecting on the pitch circles of said rotors, said rotor lobes in cross section throughout having their addendum portions generated by the intersection of the dedendum and addendum portions of the rotor lobes of the mating rotor during uniform relative rotation of the rotors, and having their dedendum portions generated by the intersection of the addendum portion and the outside diameter of the rotor lobes of the mating rotor during uniform relative rotation of the rotors.

2. Interengaging rotors in accordance with claim 1 in which the lobes of said rotors are formed on a helix.

3. Interengaging rotors in accordance with claim 1 provided with hub portions between adjacent rotor lobes formed on arcs with the axes of the respective rotors as a center of curvature, and the said arcs being tangent to the generated dedendum portions of said adjacent rotor lobes.

4. Interengaging rotors in accordance with claim 3, wherein the outside diameter of said rotors are formed on an arc concentric with the arcs forming said hub portions.

5. In a fluid device of the character described, a casing having parallel cylindrical chambers which intersect to form a common chamber, a pair of interengaging rotors mounted for rotation in said casing, said casing having inlet and discharge openings in the opposite walls thereof radially of said rotors, each of said rotors having a plurality of lobes provided with outer convex flank portions and inner concave flank portions intersecting on the pitch circles of said rotors, said convex flank portions being generated by the continuous intersecting edges of the concave flank portions and the convex flank portions of the mating rotor lobes and said concave flank portions being generated by the continuous intersecting edges of the convex flank portions and the peripheral portion of the mating rotor lobes.

References Cited in the file of this patent

UNITED STATES PATENTS

| | | |
|---|---|---|
| 502,102 | Morgan | July 25, 1893 |
| 514,659 | Morgan | Feb. 13, 1894 |
| 709,968 | Day | Sept. 30, 1902 |
| 2,014,932 | Hallett | Sept. 17, 1935 |
| 2,078,334 | Martocello | Apr. 27, 1937 |
| 2,382,042 | Etnyre | Aug. 14, 1945 |
| 2,462,924 | Ungar | Mar. 1, 1949 |
| 2,530,173 | Oldberg | Nov. 14, 1950 |

FOREIGN PATENTS

| | | |
|---|---|---|
| 527,339 | Great Britain | Oct. 7, 1940 |
| 698,575 | France | Nov. 28, 1930 |
| 763,458 | France | Feb. 12, 1934 |